United States Patent [19]

Grabow et al.

[11] Patent Number: 5,537,672
[45] Date of Patent: Jul. 16, 1996

[54] SYSTEM FOR BIDIRECTIONAL DATA TRANSMISSION BETWEEN A BEACON AND A VEHICLE

[75] Inventors: Wilhelm Grabow, Nordstemmen; Friedrich-Wilhelm Bode, Apelern, both of Germany

[73] Assignee: Robert Bosch GmbH, Stuttgart, Germany

[21] Appl. No.: 384,341

[22] Filed: Feb. 1, 1995

Related U.S. Application Data

[63] Continuation of Ser. No. 54,685, Apr. 28, 1993, abandoned.

[30] Foreign Application Priority Data

Apr. 28, 1992 [DE] Germany ............... 42 13 881.7

[51] Int. Cl.⁶ ..................................................... H04B 1/59
[52] U.S. Cl. ..................... 455/132; 455/54.1; 455/272; 375/267; 342/51
[58] Field of Search ............... 455/66, 65, 52.3, 455/54.1, 101, 106, 108, 129, 137, 138, 273, 274, 278.1, 132, 133, 134, 52.1, 272, 277.1, 277.2; 340/988–993, 905; 342/51, 42, 457, 454, 463; 375/267

[56] References Cited

U.S. PATENT DOCUMENTS

| | | | |
|---|---|---|---|
| 3,375,516 | 3/1968 | Hart et al. | 455/134 |
| 3,668,526 | 6/1972 | Raskin | 455/54.1 |
| 3,958,244 | 5/1976 | Lee et al. | |
| 4,081,748 | 3/1978 | Batz | |
| 4,193,035 | 3/1980 | Berger | |

(List continued on next page.)

FOREIGN PATENT DOCUMENTS

| | | |
|---|---|---|
| 0113571 | 7/1984 | European Pat. Off. |
| 0218843 | 4/1987 | European Pat. Off. |
| 0263332 | 4/1988 | European Pat. Off. |
| 0309855 | 4/1989 | European Pat. Off. |
| 0317181 | 5/1989 | European Pat. Off. |
| 0368545A1 | 5/1990 | European Pat. Off. |
| 0464014 | 1/1991 | European Pat. Off. |
| 0444416 | 9/1991 | European Pat. Off. |
| 0457460 | 11/1991 | European Pat. Off. |
| 0459440 | 12/1991 | European Pat. Off. |
| 2743370A1 | 8/1982 | Germany |
| 3301512 | 2/1984 | Germany |
| 3248544A1 | 7/1984 | Germany |
| 3423289 | 1/1986 | Germany |
| 4021636 | 1/1991 | Germany |
| 0233620 | 9/1988 | Japan ................ 455/54.1 |
| 4140934 | 5/1992 | Japan ................ 455/278.1 |
| 2221820 | 2/1990 | United Kingdom |
| WO83/03505 | 10/1983 | WIPO |
| WO90/04866 | 5/1990 | WIPO |

OTHER PUBLICATIONS

"A Communication Architecture for Real–Time Applications in Short Range Mobile Radio Networks", Kremer et al, 41st IEEE Vehicular Technology Conference, May 1991, St. Louis, MO (pp. 793–797).

G. Freij, d. De Preter, R. Schuessler, "Technological Options for Vehicle–Beacon Communication" Sep. 1990, pp. 11–19.

Brägas & Deuper, "Von ALI zum IVB," Bosch Technische Berichte, vol. 8, No. 1, pp. 26–31, Robert Bosch GmbH, Stuttgart 1986.

(List continued on next page.)

Primary Examiner—Reinhard J. Eisenzopf
Assistant Examiner—Nguyen Vo
Attorney, Agent, or Firm—Frishauf, Holtz, Goodman, Langer & Chick

[57] ABSTRACT

A system, for bidirectional transmission of electromagnetic data signals between a stationary unit and a vehicle unit, in which at least two antennas can be used, is proposed. The antennas are aligned at a predetermined distance and at a predetermined height from one another, in such a way that reflection from the roadway and from vehicles is minimized. In the uplink mode, the antenna having the best reception properties is selected, so that reliable data transmission to the stationary unit takes place.

10 Claims, 4 Drawing Sheets

U.S. PATENT DOCUMENTS

| | | | |
|---|---|---|---|
| 4,490,830 | 12/1984 | Kai et al. | |
| 4,513,412 | 4/1985 | Cox | 455/101 |
| 4,521,878 | 6/1985 | Toyonaga | |
| 4,528,697 | 7/1985 | Nichols | |
| 4,584,692 | 4/1986 | Yazuka et al. | |
| 4,628,517 | 12/1986 | Schwarz et al. | |
| 4,742,573 | 5/1988 | Popovic | |
| 4,850,037 | 7/1989 | Bochmann | 455/137 |
| 4,890,076 | 12/1989 | Higashi et al. | |
| 4,962,534 | 10/1990 | Taylor et al. | |
| 5,036,331 | 7/1991 | Dallabetta et al. | |
| 5,041,837 | 8/1991 | Shibano | 342/457 |
| 5,081,458 | 1/1992 | Meunier | |
| 5,095,535 | 3/1992 | Freeburg | 455/278.1 |
| 5,097,484 | 3/1992 | Akaiwa | 455/101 |
| 5,136,264 | 4/1992 | Nardozza | |
| 5,164,719 | 11/1992 | Guena et al. | |
| 5,201,071 | 4/1993 | Webb | |
| 5,203,018 | 4/1993 | Hirose | |
| 5,319,802 | 6/1994 | Camiade | 455/54.1 |
| 5,444,742 | 8/1995 | Grabow et al. | 340/905 |

OTHER PUBLICATIONS

Automotive Electronics Journal, Jan. 29, 1990, p. 19.

Von Tomkewitsch, "Dynamic Route Guidance . . . " IEEE Transactions on Vehicular Technology, vol. 40, No. 1, Feb. 1991, pp. 45–50.

Christopher O'Malley, "Electronics as Your Co–Pilot," *Popular Science,* Sep. 1991, pp. 66–69.

Zinke & Brunswig, *Lehrbuch Der Hochfrequenztechnik,* 2nd Ed., vol. 2, Springer–Verlag, Berlin–Heidelberg–New York, pp. 301–320.

P. T. Blythe, "Advanced Telematics in Road Transport," Proceedings of the DRIVE Conference, Brussels, Belgium 1991 vol. 1, pp. 248–269; Elsevier for Commission of the Eur. Comm.

European Radiocommunications Committee, Report 3, Lisbon, Feb. '91.

Lothar Tschimpke, "Mobile UKW–Empfang im bebautem Gebiet und Empfangsverbesserung durch Diversity," [Mobile FM reception in built–up areas and recep. improvement using diversity] in 579 *Rundfunktechnische Mitteilungen,* vol. 25 No. 1, pp. 16–20 (1981) [Broadcast Technology News].

SYSTEM FOR BIDIRECTIONAL DATA TRANSMISSION BETWEEN A BEACON AND A VEHICLE

This application is a Continuation of application Ser. No. 08/054,685, filed Apr. 28, 1993, now abandoned.

Cross-reference to related patents and applications, assigned to a subsidiary of the present assignee, the disclosures of which are hereby incorporated by reference:

U.S. Pat. No. 5,195,109, BOCHMANN et al., issued Mar. 16, 1993;

U.S. Pat. No. 4,939,791, BOCHMANN, issued Jul. 3, 1990;

U.S. Ser. No. 07/908,185, WIEDEMANN, filed Jul. 1, 1992;

U.S. Ser. No. 07/910,643, BOCHMANN, filed Jul. 8, 1992;

U.S. Ser. No. 07/935,848, WIEDEMANN et al., filed Aug. 26, 1992.

Cross reference to related application, assigned to the assignee of the present application: DE-OS 40 39 887 (pub. June '92) and corresponding PCT/DE 91/00926, filed Nov. 27, 1991, of which the U.S. national phase is U.S. Ser. No. 08/039,336 SIEGLE et al., filed Apr. 27, 1993; German applications of Apr. 28, 1992: P 42 13 879, P 42 13 880, and P 42 13 882, and corresponding U.S. applications filed Apr. 28, 1993: 08/054,686; 08/054,687; and 08/054,688.

FIELD OF THE INVENTION

The invention relates generally to a system for bidirectional, electromagnetic transmission of data signals between a stationary unit and a corresponding vehicle unit.

BACKGROUND

It is already known, for applications in traffic control technology, to exchange data between a stationary beacon and a vehicle moving past it. In the publication, Proceedings of the Drive Conference: "Advanced Telematics in Road Transport", Feb. 4–6, 1991, Vol. 1, it is proposed, in the context of the PAMELA project, that a data exchange be carried out in the microwave range with an active or passive transponder.

Data are transmitted from a beacon unit to the transmission and reception part of the vehicle unit in what is known as the downlink mode, by means of amplitude-modulated signals. The data transmission from the vehicle to the beacon is done in the uplink mode by the transponder principle. The beacon sends an unmodulated carrier signal, which is received by the vehicle unit. This received signal is frequency-modulated with the data to be transmitted and is received again by the beacon unit.

It has been found, however, that in the signal transmission between the beacon and vehicle, the wave propagation can take place over both direct and indirect paths via reflection from the road surface or from other vehicles. This causes undesirable interference or fading. With multi-path propagation, the field intensity is therefore strongly dependent on the reception site and on the frequency. Reliable data transmission is therefore not always assured.

SUMMARY OF THE INVENTION

The system according to the invention has the advantage over the prior art that, by using at least two spatially separated antennas, the influence in the changes in field intensity as a function of the reception site can be largely compensated for. If a local minimum occurs at one antenna, then if the second antenna is skillfully deployed, a local maximum can occur, so that one of these antennas is then especially predestined for transmission or reception. The selection of the appropriate antenna is made by the evaluation circuit, preferentially on the basis of the signals received.

It is particularly advantageous that in the downlink mode the evaluation circuit adds the signals received from the antennas, so that a higher receiving level can be utilized for the data signals.

In the uplink mode, the antenna that had the highest receiving level and thus assures reliable data transmission is selected for the transmission.

It is also favorable that the bidirectional data exchange works by the time division multiplex process, because, in each time slot, a unique association between the transmission and the reception mode is assured.

To avoid a local reception minimum as much as possible, it is especially favorable to vary the spacing or height of the antennas.

In the downlink mode, an improvement in signal evaluation is attained by adding the two signals received by the antennas. They can easily be sent to a decision maker, which by way of example is formed as a comparator and that favors the further evaluation of the data signals.

In the uplink mode, in order to select the antenna with the best, most favorable transmission properties at that moment, the evaluation circuit first measures the amplitude of the signal transmitted by the stationary unit and evaluates it by means of a comparator. By simply changing over the best transmission antenna at the moment, particularly reliable data transmission to the stationary unit is attained. On the other hand, to prevent the unintentional changeover of the antennas during transmission in the event that the reception properties vary sharply, it is advantageous to provide a buffer memory that prevents the changeover during the uplink mode.

The system can advantageously be used for transmitting traffic or navigation data. It may also be used for automatically debiting road use fees, without the driver having to stop at a toll station.

Other advantages of the invention will become apparent from the detailed description.

DRAWINGS

DETAILED DESCRIPTION

Figure 1:
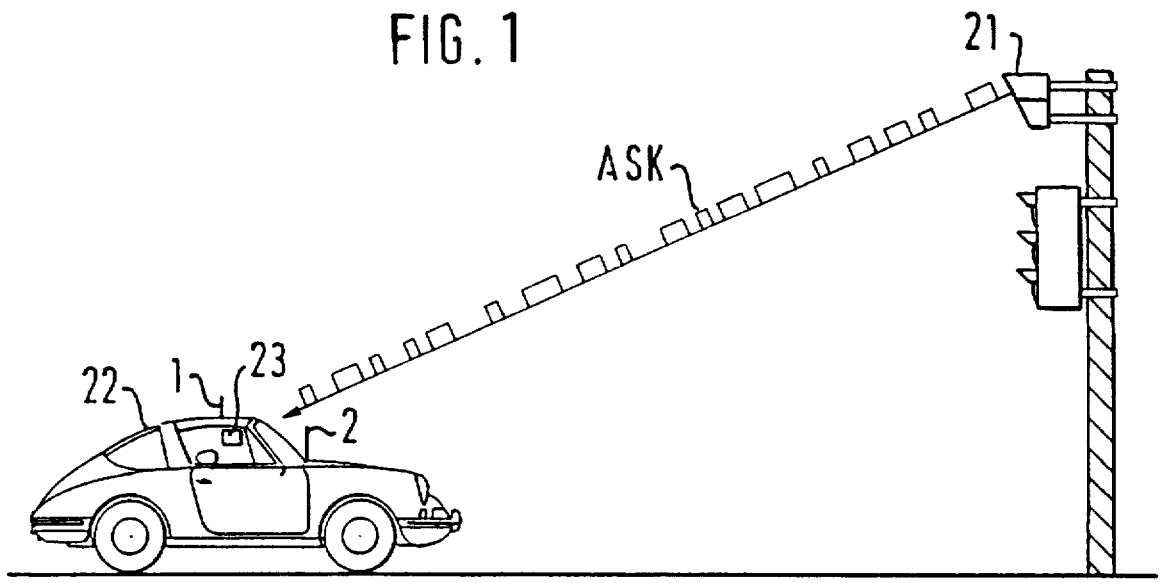
FIG. 1 shows the basic data transmission from the beacon to the vehicle in the downlink mode.

FIG. 1 shows a motor vehicle 22, which has a vehicle unit 23, not shown in detail. The vehicle unit 23 is connected to antennas 1, 2. The antennas 1, 2 operate in the microwave range at 5.8 GHz, for instance, and are in communication with a beacon 21, which is secured as a stationary unit to a traffic light or signal carrier in such a way that it is capable of radiating over a specific portion of the roadway. FIG. 1 also shows the signal transmission from the beacon 21 to the vehicle unit 23 in the downlink mode by means of an amplitude-modulated data signal ASK. The beacon unit 21 with the amplitude shift keying (ASK) modulation is known per se and need not be described in further detail here. The vehicle unit 23 for evaluating the ASK signal is known as well. This kind of receiving unit in the vehicle is typically called an on-board unit (OBU).

Figure 2:
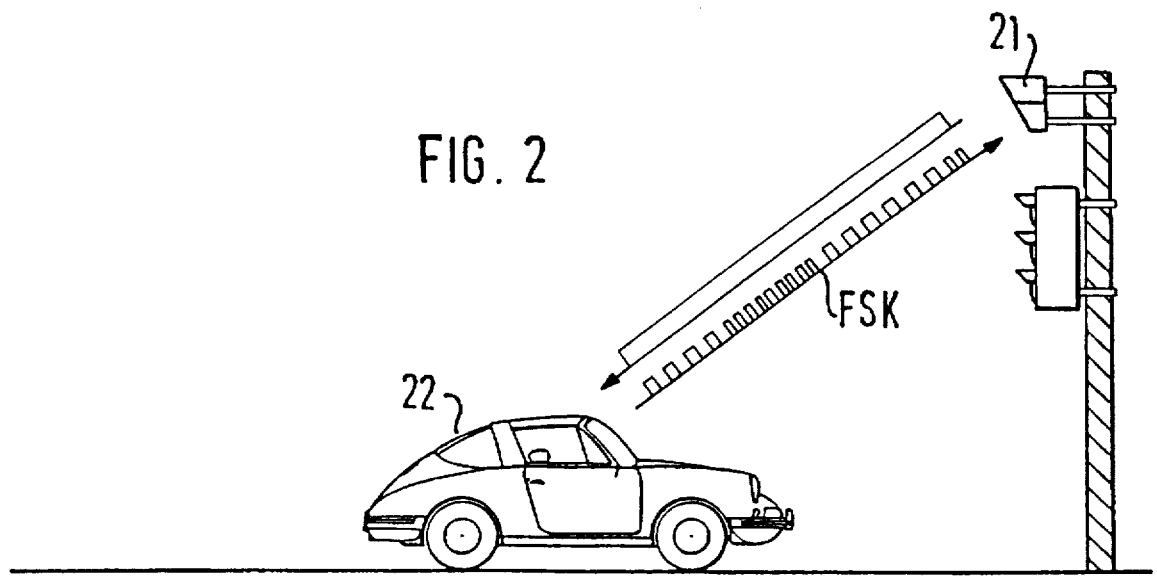
FIG. 2 shows the data transmission from the vehicle to the beacon in the uplink mode by the semi-passive transponder principle.

FIG. 2 shows the motor vehicle 22 in the uplink mode; that is, the vehicle unit 23 is now transmitting to the beacon 21 by the semipassive transponder mode. To that end, the beacon sends an unmodulated carrier signal (CW carrier). This signal is received by the OBU and is modulated with a frequency-shift-keyed signal (FSK signal) that is dependent on the data stream to be transmitted. This modulation is done for instance by changing over or modulating the reflectance at the output of the antenna element. The changeover of the reflectance can be done in the simplest case by means of the diode used for receiving the demodulation. The thus-modulated signal is broadcast by one of the two antennas of the vehicle unit 23 and received by the beacon 21. The semipassive transponder process used is known per se from the aforementioned publication in the Proceedings of the Drive Conference. This transmit/receive process has the advantage that the transmit/receive circuit can be made very simply and economically. Another advantage is that this transceiver unit has only a very short range, so that it cannot interfere with other vehicles or their units.

Figure 3:
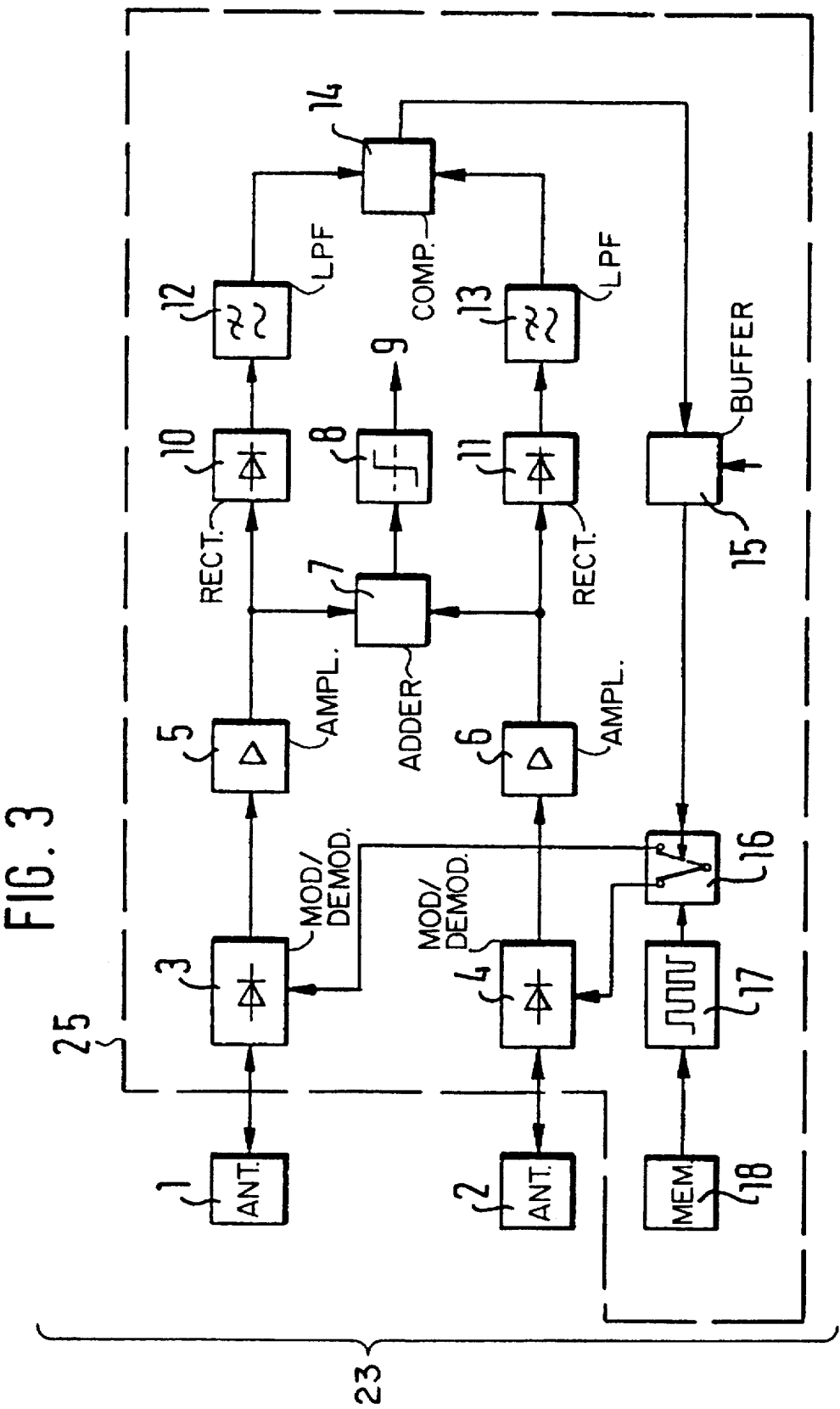
FIG. 3 shows an evaluation circuit.

FIG. 3 shows a block circuit diagram for an evaluation circuit 25, which is connected to both antennas of the vehicle unit 23. One antenna each is connected with a separate modulator/demodulator 3, 4. The output of each modulator/demodulator is connected to an amplifier 5, 6, whose output signals are first combined in an adder 7. The output of the adder is connected to a decision maker 8. Using its comparator, the decision maker 8 converts the arriving analog signals into digital signals, which are then available at the output 9 as a downlink data stream for further data processing.

The outputs of the amplifier 5, 6 are also each connected to one following rectifier 10, 11 having a respective low-pass filter 12, 13. The two outputs of the low-pass filters 12, 13 are carried to the inputs of a comparator 14. The output of the comparator 14 is connected to a buffer memory 15, which in turn controls a changeover unit 16. The changeover unit 16 controls the modulators 3, 4 for the antennas 1, 2 in the uplink mode as a function of the signal from comparator 14. The changeover unit 16 transmits uplink data that are taken via an FSK generator 17 from data memories 18, and are to be transmitted to the beacon 21. The transmission of these data is done by the above-described semi-passive transponder principle, with an FSK generator.

The components of the evaluation circuit 25 are known commercially available circuits, and those from any of several manufacturers are suitable.

OPERATION

The mode of operation of this arrangement will now be described, referring to FIGS. 4–7. It is known that the vehicle unit is equipped with an antenna that is tuned to the transmission signals of the beacon 21. According to the invention, it is now proposed that at least two antennas be used, which are located on the vehicle and communicate with the beacon 21. It is important that the antennas be spaced apart from one another laterally by a specified distance, and their height (distance of the antenna from the road surface) must also be taken into account.

Figure 4:
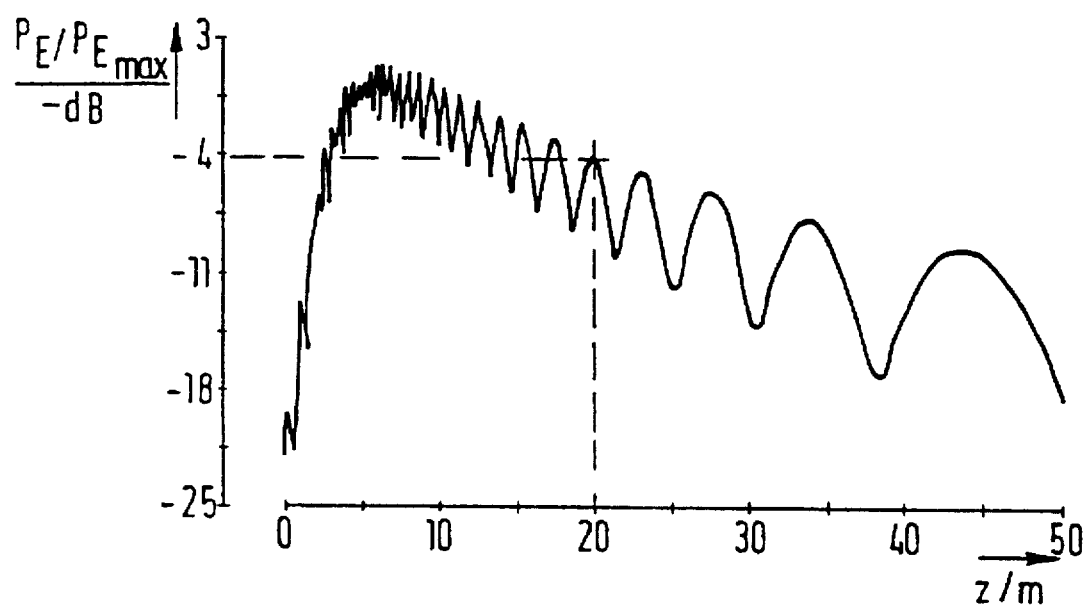
FIG. 4 is a graphical diagram of receiving power of a single antenna versus distance from a beacon, with the antenna located at a height of 1m.
Figure 5:
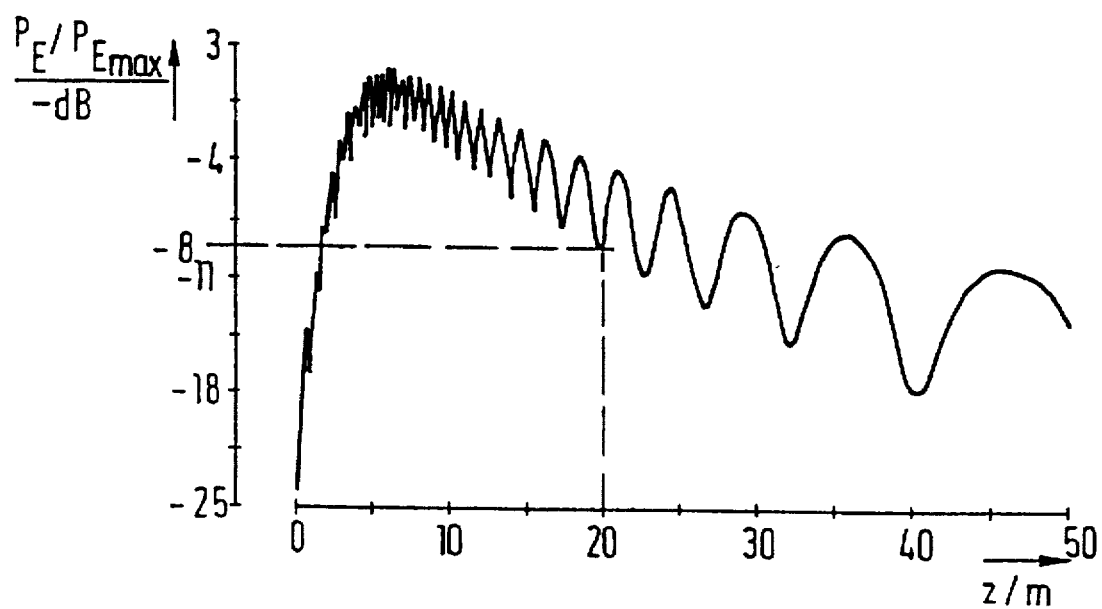
FIG. 5 is a graphical diagram of receiving power of a single antenna system versus distance from a beacon, with the antenna located at a height of 1.05 m.

For illustration purposes, FIGS. 4–7 are various diagrams in which the standardized receiving power of the antenna is plotted over the distance from the beacon 21. For example, FIG. 4 shows an oscillating curve, which has a maximum approximately −4 dB for a distance of 20 m. In this test arrangement, the antenna is located at a height of 1 m. The oscillating frequencies are due to pronounced reflection from the road surface and interfere considerably with the reception quality or reliability of data transmission. As FIG. 5 shows, in an antenna located at a height of 1.05 m, at otherwise identical conditions a minimum in receiving power can be seen. In this case, the damping at approximately −8 dB is especially strong. The smaller difference in height of only 5 cm in this arrangement demonstrates a considerable impairment in reception quality of the antenna.

Figure 6:
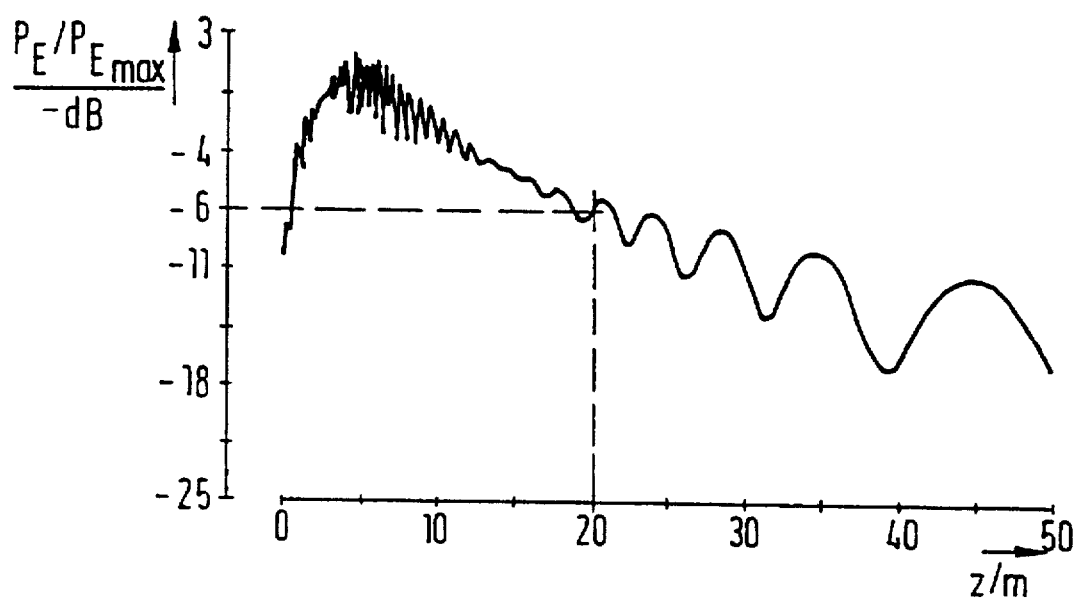
FIG. 6 is a graphical diagram of receiving power of a two antenna system according to the present invention versus distance from a beacon, with the antennas located at heights of 1 m and 1.05 m.

Now, if in accordance with the invention two antennas 1, 2 are used, with one antenna at a height of 1.0M and the other at a height of 1.05 m, then the standardized receiving power is as shown in the third diagram, in FIG. 6.

Figure 7:
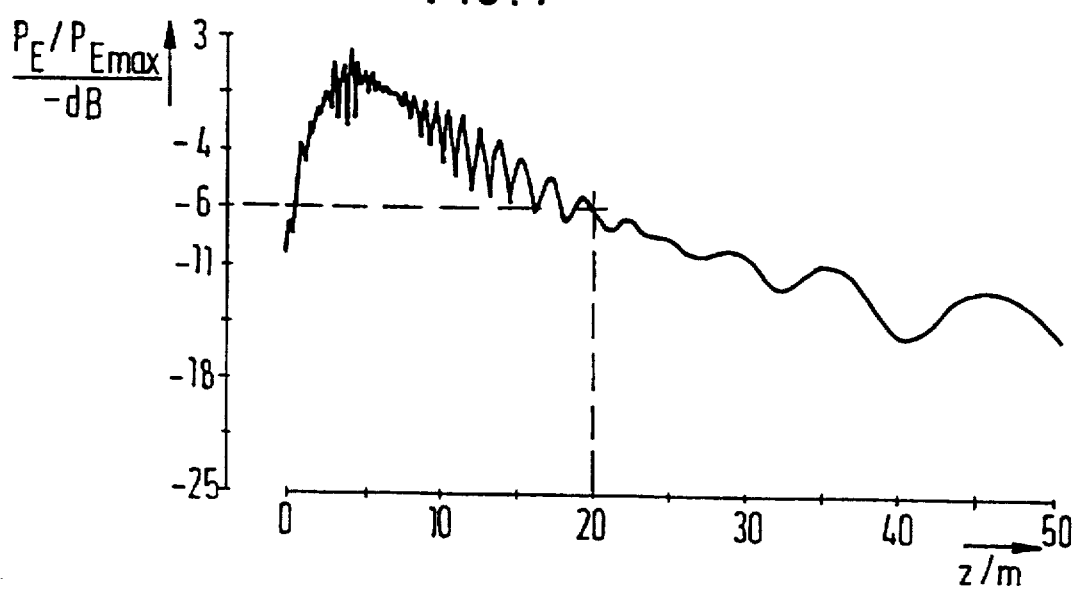
FIG. 7 is a graphical diagram of receiving power of a two antenna system according to the present invention versus distance from a beacon, with the antennas located at heights of 1 m and 1.08 m.

A similar outcome is attained in the fourth diagram of FIG. 7, where the antennas are at a height of 1.00 m and 1.08 m. These two diagrams of FIGS. 6, 7 no longer have such pronounced oscillating frequencies as those of FIGS. 4 and 5. This shows that the effects of reflection from the street are no longer so pronounced.

The fact that the curves of diagrams 4–7 first rise and then fall again is due substantially to the fact that the receiving power is highest in the vicinity of the beacon and decreases as the distance increases. The range of data transmission is therefore limited to the range of the beacon, which might perhaps be 50 m, and this is entirely desirable.

If the distance between the two antennas is changed, a similar influence on the receiving power results. A further feature of the invention provides that it is also possible to use more antennas, such as 3 or 4 of them, to receive the data signals.

Because of the amplitude modulation, the demodulated signals from the two antennas 1, 2 can simply be added by circuitry, as can be seen from FIG. 3. The resultant signal power is higher and has less waviness compared with the use of a single antenna element. As can be seen from FIGS. 6 and 7, the course of the standardized signal power, especially in the range between 10 m and 20 m, is considerably lower in waviness than that with a single element as in FIGS. 4 and 5. By suitably varying the vertical spacing of the antennas 1, 2, the roadway reflections within a certain range of distance from the beacon 21 can be optimized to minimize their waviness. If the influence of reflections from neighboring vehicles is to be reduced, then the antennas 1, 2 must be spaced apart horizontally by a distance that likewise results in minimization of the waviness. By combining the vertical and horizontal spacing of the antennas from one another, and optionally including the characteristics of the vehicle body, the overall result for a specific distance from the beacon 21 is minimum waviness of the receiving power.

In the uplink mode, however, the broadcasting cannot be done simultaneously from both antennas 1, 2, because otherwise the antennas would generate an interference field. The evaluation circuit 25 therefore selects from the two antennas 1, 2 the one that has the best reception data at that moment. At the high carrier frequency of 5.8 GHz, for instance, only a few milliseconds are needed in the uplink-mode. Even a fast-moving motor vehicle covers a distance of approximately 0.1 m within this period of time. This change in spacing is relatively slight in comparison with the distance from the beacon, and can be ignored, as FIGS. 6 and 7 show. At a distance of less than 10 or 15 m from the beacon 21, the receiving power is so high that once again the reflections can be ignored.

At a greater distance from the beacon, of approximately 15 to 30 m, however, the selection of the most favorable antenna is important for reliable data transmission. Since by the time slot process, both antennas first deliver their reception signals in the downlink mode to the comparator 14 via the demodulators 3, 4, the amplifiers 5, 6, and the rectifiers 10, 11 followed by the low-pass filters 12, 13, the comparator can select the high signals by simple comparison and send information accordingly to a changeover unit 16. The changeover unit 16 then selects the proper antenna for now transmitting the vehicle data in the uplink mode. For instance, if the antenna 2 were to be the preferred antenna after the comparator selection, then first the comparator signal would be stored in the buffer memory 15, to prevent the changeover unit 16 from being changed over during the uplink mode. The uplink data stream, which is taken from a memory 18 of the vehicle unit, is then frequency-modulated via an FSK generator 17 and carried to the antenna 2 via the changeover unit 16 and the modulator 4. The antenna 2 then broadcasts this frequency-modulated signal, which is received by the beacon 21.

If the antenna 1 had the better reception data, then the changeover unit 16 would changeover via the modulator 3 to the antenna 1, which would then broadcast the modulated signal.

Reliable data transmission to the beacon 21 is assured by selecting the antenna with the best reception quality at the moment.

In principle, the proposed system for bidirectional data transmission is independent of the type of modulation, so that a different type of modulation, such as phase modulation, may also be employed.

Various changes and modifications may be made, and features described in connection with any one of the embodiments may be used with any of the others, within the scope of the inventive concept.

What is claimed is:

1. A land vehicle transponder unit (23) for use in a system for bidirectional transmission of electromagnetic data signals between a stationary beacon (21) and said vehicle transponder unit (23) which is located in a vehicle, wherein the stationary beacon (21) transmits, in a downlink mode, encoded data signals to the vehicle transponder unit (23), and the vehicle transponder unit (23) transmits, in an uplink mode, encoded data signals to the stationary beacon (21) according to a semi-passive transponder principle, the vehicle transponder unit (23) comprising:

two spatially separated antennas (1, 2) spaced apart by both of a predetermined horizontal separation in a lateral direction and a predetermined height separation in a vertical direction above a road surface on which said vehicle is situated, to assure differing reception conditions, wherein said predetermined horizontal separation and said predetermined height separation are set to minimize reflections from neighboring vehicles and reflections from the road surface, respectively; and an evaluation circuit (25), having a respective input (3, 4) connected to each of said antennas, and including:

a single modulator/demodulator for each of said antennas, to transmit/receive respective signals with said antennas, a comparator for providing a comparison between respective signal strengths of said signals received from said antennas, means for providing a determination as to which one of said antennas provides a higher signal strength in response to said comparison, and means for selecting the single modulator/demodulator corresponding to said one of said antennas for use in transmitting to said beacon (21) during a following uplink mode in response to said determination.

2. The transponder unit of claim 1, wherein:

the stationary beacon (21) transmits, in said downlink mode, amplitude-modulated signals as said encoded data signals to the vehicle transponder unit (23), and the evaluation circuit (25) in the downlink mode adds respective said amplitude-modulated signals received from the antennas (1, 2) and evaluates a resulting summation signal thereof.

3. The transponder unit of claim 1, wherein the stationary beacon (21) and the vehicle transponder unit (23) exchange data signals by a time division multiplex process.

4. The transponder unit of claim 1, wherein the stationary beacon (21) in the downlink mode encodes data signals by amplitude modulation, and the vehicle transponder unit (23) in the uplink mode encodes data signals by frequency modulation.

5. The transponder unit of claim 1, wherein:

each said single modulator/demodulator (3,4) for each of said antennas (1, 2) produces demodulated signals in response to said signals received from said antennas;

in the downlink mode, an adder (7) adds the demodulated signals and delivers them to a decision maker (8); and the decision maker (8) is provided to digitize the delivered signals for further data processing.

6. The transponder unit of claim 6, wherein the evaluation circuit (25) compares the demodulated signals using said comparator (14) to determine a maximum amplitude at an onset of the uplink mode, and then selects the antenna that had a best reception signal in order to use the selected antenna in transmitting to said beacon (21) during a following uplink mode.

7. The transponder unit of claim 6, wherein the evaluation circuit (25) has a memory (15), which prevents a changeover among said antennas (1, 2) during the uplink mode.

8. The transponder unit of claim 1, wherein said electromagnetic data signals comprise traffic/navigation data.

9. The transponder unit of claim 1, wherein said electromagnetic data signals comprise data for debiting road usage tolls.

10. A method for providing a land vehicle transponder unit (23) for use in a system for bidirectional transmission of electromagnetic data signals between a stationary beacon (21) and said vehicle transponder unit (23) which is located in a vehicle, wherein the stationary beacon (21) transmits, in a downlink mode, encoded data signals to the vehicle transponder unit (23), and the vehicle transponder unit (23) transmits, in an uplink mode, encoded data signals to the stationary beacon (21) according to a semi-passive transponder principle, the steps of:

arranging two antennas (1, 2) to be spaced apart by both of a predetermined horizontal separation in a lateral direction and a predetermined height separation in a vertical direction above a road surface on which said vehicle is situated, to assure differing reception conditions, wherein said predetermined horizontal separation and said predetermined height separation are set to minimize reflections from neighboring vehicles and reflections from the road surface, respectively;

transmitting/receiving respective signals with said antennas, comparing respective signal strengths of said signals received from said antennas to provide a comparison thereof, determining which one of said antennas provides a higher signal strength in response to said comparison to provide a determination, and selecting the one of said antennas for use in transmitting to said beacon (21) during a following uplink mode in response to said determination.

* * * * *